United States Patent [19]

Robertson

[11] 4,177,082

[45] Dec. 4, 1979

[54] PROCESS FOR GRANULATING PIGMENT COMPOSITIONS

[75] Inventor: George H. Robertson, Cincinnati, Ohio

[73] Assignee: Ciba-Geigy Corporation, Ardsley, N.Y.

[21] Appl. No.: 888,606

[22] Filed: Mar. 20, 1978

[30] Foreign Application Priority Data

Mar. 18, 1977 [GB] United Kingdom ............... 11633/77

[51] Int. Cl.$^2$ .............................................. C09C 3/08
[52] U.S. Cl. ................... 106/309; 106/288 B; 106/288 Q; 106/308 Q; 106/308 C; 106/308 F; 106/308 N; 106/308 M
[58] Field of Search .......... 106/308 M, 308 C, 308 N, 106/308 Q, 288 Q, 309

[56] References Cited

U.S. PATENT DOCUMENTS

| | | | |
|---|---|---|---|
| 2,822,337 | 2/1958 | Evans | 252/465 |
| 4,001,035 | 1/1977 | Ito et al. | 106/308 M |
| 4,015,999 | 4/1977 | Robertson et al. | 106/288 Q |
| 4,036,652 | 7/1977 | Rothmayer | 106/308 N |
| 4,055,439 | 10/1977 | Bäbler | 106/288 Q |

OTHER PUBLICATIONS

Kirk–Othmer, Encyclopedia of Chem. Tech., vol. 2, 1964, pp. 416, 418–419, 600, & Suppl. vol., 1972, pp. 888–889, 896.

*Primary Examiner*—Helen M. McCarthy
*Attorney, Agent, or Firm*—Joseph F. DiPrima

[57] ABSTRACT

A process for producing a pigment or dyestuff composition in the form of dustless readily-dispersible granules which comprises contacting, with agitation, an aqueous dispersion of a pigment, an organic carrier, and an aniline which is liquid at temperatures below 100° C., insoluble in water at pH values above 7, and soluble in water at pH values below 7, the pH value being first above 7, maintaining the temperature above the melting point of the aniline and reducing the pH to below 7 to render the aniline soluble in water, and recovering the resulting granules.

15 Claims, No Drawings

PROCESS FOR GRANULATING PIGMENT COMPOSITIONS

The present invention relates to a process for the preparation of dustless, readily-dispersible pigment granules.

The preparation of pigment granules by a process which comprises stirring together in aqueous pigment dispersion and a solution of a water-insoluble organic carrier in a water-immiscible organic liquid is known. However, in the known processes the resulting product contains some solvent, and it is necessary to remove the organic solvent from the product by distillation. We have now discovered a process in which the product is obtained directly in a solvent free condition.

According to the present invention there is provided a process for producing a pigment composition in the form of dustless readily-dispersible granules which process comprises contacting, with agitation, an aqueous dispersion of a pigment, and a mixture of an organic carrier and an aniline for ex. aniline itself, or mono- or di-alkyl aniline in which each alkyl group has 1 to 8 carbon atoms or a derivative thereof, the aniline being liquid at temperatures below 100° C., insoluble in water pH values above 7 and soluble in water at pH values below 7, the pH value being first above 7 maintaining the temperature above the melting point of the aniline compound and reducing the pH to below 7, to render the aniline compound soluble in water and recovering the resulting granules.

The pigments that can be used are those which are water insoluble and stable in the pH range required for granule formation and isolation. Suitable pigments are azo, azomethine, anthraquinone, phthalocyanine, nitro, perinone, perylene, dioxazine, thioindigo, isoindolinone, quinacridone, quinophtalones, azo or azomethine metal salts or complexes; mixtures of pigments may also be used. Water insoluble dyestuffs are those such as the solvent soluble azo and phthalocyanine dyes. These dyes can also be used as mixtures and in admixture with the pigment.

The organic carrier may be any organic compound which is soluble in or at least softened by the aniline compound, and is insoluble or can be rendered insoluble in water throughout the pH range used in the process. The carrier can be a liquid if the ratio of pigment to carrier is high, for example at or above 90:10; at lower proportions of pigment it is preferable to have a compound having a melting point above 40° C. as carrier.

Suitable carriers include, for example, carboxylic acid esters derived from alkyl, aryl, aralkyl or cycloalkyl carboxylic acid or polyacids and alkyl, aryl, aralkyl, or cycloalkyl mono- or poly-hydroxy compounds, such as the fatty acid esters cetyl palmitate, glycerol tristearate, glycerol monostearate, glycerol tripalmitate, glycerol trioleate, ethylene glycol dilaurate, ethylene glycol distearate, diethylene glycol distearate or the benzoic acid esters, such as ethylene glycol dibenzoate, neopentyl glycol dibenzoate, trimethylol ethane tribenzoate, trimethylol propane tribenzoate or the dicarboxylic acid esters, such as dibenzyl phthalate, dibutyl phthalate, dioctyl phthalate, dicycohexyl phthalate, and similar esters of adipic, sebacic or azelaic acids; amides from the above carboxylic acids and ammonia, or alkyl aryl, aralkyl or cycloalkyl mono- or poly-amides, such as stearamide, oleamide, palmitamide, N-alkyl stearamides or oleamides, ethylene bis stearamide; phosphate esters such as triphenyl or tricresyl phosphate, resins such as hydrocarbon resins, xylene-formaldehyde resins, coumarone, coumarone-indene and ketone resins; vinyl polymers, such as polyvinyl chloride and vinyl chloride copolymers, acrylate and methacrylate polymers and copolymers, polyvinyl acetate and vinyl acetate copolymers; styrene homo and copolymers; polyolefines such as polyethylene, polypropylene and polyisobutylene; fatty alcohols which are water insoluble, such as, cetyl alcohol and stearyl alcohol; and fatty amines which themselves do not give water soluble salts, such as didodecyl amine and distearyl monomethyl amine; and fatty oxazolines; water insoluble carboxylic acids, for example $C_{12}$ and greater fatty acids, such as lauric acid, stearic acid, behenic acid and the rosin derivatives, such as wood rosin or its hydrogenated or disproportionated versions. These acids may also be added to the pigment as their alkali metal or ammonium salt dissolved in water: in this case the process is preferably carried out in the presence of water soluble salts, e.g. sodium chloride or calcium chloride.

The aniline compound may be, for example, aniline, N-methyl aniline, N-ethyl aniline, N-propyl aniline, N-butyl aniline, N,N-dimethyl aniline or N,N-diethyl aniline, N-cyclohexyl aniline, N-cyclohexyl N-hydroxyethyl aniline, N-octyl aniline, but is preferably N,N-diethyl aniline.

The ratio of pigment to carrier may be from 95:5 to 50:50, preferably from 90:10 to 60:40.

The amount of aniline compound used is that which will form a solution of or at least soften the carrier. When using high ratios of pigment to carrier or when using a carrier which is poorly soluble in the aniline compound, higher proportions of the aniline compound may be needed to form satisfactory granules. Usually the amount of aniline compound is from 0.1 to 2 parts, preferably 0.2 to 0.6 parts by weight per part of pigment.

The order of mixing the components is not critical. For example, the carrier can be added to a mixture of pigment and aniline compound or the aniline compound can be added to a mixture of carrier and pigment or the aniline compound and carrier, optionally dissolved, can be added to the pigment dispersion. Thus as well as using pure pigments, ready-for-use pigment preparations may be used, i.e., preparations which contain, in addition to the pigment, for example 5 to 90%, preferably from 10–40% by weight of a carrier. The carrier may also be added in the form of an aqueous dispersion, e.g. aqueous dispersions of polymers or resins, such as polyvinyl chloride, polyvinyl chloride copolymers and low molecular weight (oxidised) polyethylene.

Preferably a protective colloid is added to the mixture to assist in the formation of granules. When used it is preferably mixed with an aqueous pigment slurry or an aqueous dispersion of the aniline compound before the pigment and aniline compound are brought together. Suitable protective colloids include cellulose derivatives such as hydroxy ethyl cellulose, hydroxy propyl cellulose, polyvinyl alcohol, polyethylene oxide, polypropylene oxide, copolymers of ethylene oxide and propylene oxide, adducts of ethylene oxide or propylene oxide, polyvinyl pyrrolidone and its copolymers or mixtures of these compounds. The preferred compounds are those of the hydroxy ethyl cellulose type as exemplified by the Natrosol range of the Hercules Powder Company. When polymers of the ethylene or propylene oxide type are being used it is advantageous to carry out the preparation above the cloud point (see Kirk-Othmer's Encyclopedia of Chemical Technology, Vol. 19, p.531) of the surfactant, and at the lower levels of concentrations. The amount of protective colloid may be up to 15%, but is preferably less than 5% by weight of the pigment.

The process may be carried out at a selected temperature, at which the carrier is at least softened, but preferably dissolved in the aniline derivative at the temperature used.

The mixture is originally formulated at or adjusted to a pH of at least that at which the aniline compound is insoluble in water. This is usually above 7, preferably above 9. This may be accomplished by adding an alkali such as sodium hydroxide. The mixture is stirred until the pigment has migrated from the aqueous phase to the organic phase. Sufficient stirring is used to keep the droplets (or granules) in suspension. The size of granule is controlled to some extent by the speed of stirring. Increased stirring or turbulence gives a reduction in granule size. The granules may be from 0.1 to 5 mm. in diameter, but preferably from 0.5 to 2 mm. in diameter.

The pH of the mixture is then reduced to below that at which the aniline compound becomes soluble in water. This is usually below 7, preferably below 5, by the addition of an acid which will form a water-soluble salt with the aniline compound. The preferred acid is hydrochloric acid. This causes the aniline compound to dissolve in the water as a salt, leaving the organic carrier and pigment granules in suspension. If necessary, e.g. to promote solution, or if desired for handling or product performance, the temperature of the mixture may be increased or decreased. The granules are then recovered by sieving, washing and drying. Any granules that are too small to be recovered in this way may be filtered off and re-used in a subsequent batch.

To recover the solvent, the pH of the filtrate is raised, usually to a pH above 7, e.g. 10, whereupon the solvent becomes insoluble, separates from the water and can be recovered for subsequent use by decantation for example. The aniline derivative may be further purified, if necessary, by steam distillation.

It is also possible to combine the granulation process of the present invention with a pigment solvent treatment process, to improve those pigment properties known to be improved by a solvent treatment. The solvent treatment can be carried out before or during the granulation step. For example, a phthalocyanine in a highly aggregated state of an $\alpha/\beta$ crystal form mixture, as produced by dry grinding, may be de-aggregated and converted substantially to the $\beta$-form using the aniline compound as the solvent in a solvent treatment process.

The products of the invention may be used for the pigmentation of any system, such as surface coating media, e.g. paint and ink, or plastics. The carrier used will normally be selected so as to be compatible with the system to be pigmented. The product, when incorporated into the system, releases the pigment from the granule to colour the material.

The invention is illustrated by the following Examples, wherein parts are parts by weight.

EXAMPLE 1

25.5 Parts C.I. Pigment Yellow 93 from a 30% w/w aqueous presscake were stirred with 600 parts water containing 0.5 parts hydroxyethyl cellulose for 10 minutes at room temperature. 13 Parts by weight diethyl aniline were added and the pH raised to 10.0; 1.5 parts sorbitan tristearate and 3.0 parts dicyclohexyl phthalate were added and the temperature raised to 85° C. After stirring for a further 30 minutes at 85° C. the pH was lowered to 1.0 by the addition of 5 N hydrochloric acid.

Stirring was continued for a further 60 minutes and the granules so formed were recovered by passing the mixture through a B.S. 60 mesh sieve and washing with, alternately, water at 50° C. and water at room temperature until chloride free. The granules, after drying at 40° C. in a drying cabinet with circulating air, gave a clear yellow film on incorporation in polyvinyl chloride and polyethylene.

EXAMPLE 2

The procedure of Example 1 was repeated, except that 3.0 parts hydrocarbon resin (Hercules A80) replaced the 3.0 parts dicyclohexyl phthalate. Similar results were obtained.

EXAMPLE 3

The procedure as of Example 2 was repeated, except that 19 parts by weight diethylaniline were used as solvent. Similar results were obtained.

EXAMPLE 4

To 18.0 parts C.I. Pigment Yellow 13 in 600 parts water, obtained by a conventional acetate buffered aqueous coupling, was added 0.36 parts hydroxyethyl cellulose. The pH was raised to 10.0 by the addition of 2 N sodium hydroxide and 2.4 parts sorbitan tristearate and 10 parts by weight diethylaniline were added. The temperature was raised to 85° C. and maintained for 30 minutes then 9.6 parts Hercules A80 was added. After a further 30 minutes stirring, the pH was lowered to 1.0 and, after stirring for a further 4 hours, the product was separated as in Example 1. The product could be incorporated into a thin lithographic ink to give a satisfactory dispersion.

EXAMPLE 5

0.2 Parts hydroxyethyl cellulose were dissolved in 200 parts water. 18 Parts C.I. Pigment Blue 15.3 slurried with 120 parts water were added with 3.7 parts in 200 parts water of the salt formed between C.I. Direct Blue 86 and Rosin Amine D. To this mixture was added 10 parts diethylaniline and the pH adjusted to 10.0 by the addition of 2 N sodium hydroxide. The temperature was raised to 85° C. and held at this temperature for 30 minutes. 20 Parts of a melt of Hercules A80 (a hydrocarbon resin from Hercules Powder Company) and cetyl alcohol in the ratio 2:1 were added and after a further 60 minutes the pH was lowered to 1.0 by the addition of 5 N hydrochloric acid. Stirring was continued for a further 60 minutes and the resulting granules recovered as in Example 1. The pigmented granules thus produced could be readily dispered in publication gravure medium.

EXAMPLE 6

0.2 Parts hydroxyethyl cellulose were dissolved in 200 parts water and to this was added 27 parts copper phthalocyanine (previously ground with 12% w/w calcium chloride to an $\alpha/\beta$ ratio of 60:40) in 150 parts water and 7.5 parts in 300 parts water of the salt formed between C.I. Direct Blue 86 and monomethyl di (hydrogenated tallow) amine. 10 parts diethylaniline were added and the pH of the mixture then raised to 10.0 as in Example 5, and the process and quantities thereafter were again as in Example 5. The pigmented granules thus produced could be readily dispersed in publication gravure medium.

EXAMPLE 7

To a stirred aqueous slurry of 100 parts of pigment—C.I. Pigment Yellow 13—there were added 2 parts of hydroxyethyl cellulose. The temperature was raised to 80° C. and the pH adjusted to 10 by the addition of 2 N sodium hydroxide. A solution of 20 parts dicyclohexyl phthalate in 50 parts diethyl aniline was then added and the mixture stirred until the pigment had migrated from the aqueous phase into the organic phase. The pH was then adjusted to 1 by addition of hydrochloric acid. Stirring was maintained at pH1 for a further 15 minutes. The pigment composition—120 parts—was then removed by sieving (60 mesh) and washed initially with water+acid (pH3) and then with water alone. The product was dried at 60° C. The resultant non-dusting composition was satisfactorily incorporated into a lithographic varnish.

EXAMPLE 8

To a stirred aqueous slurry of 40 parts C.I. Pigment Blue 15.3 in 800 parts of water at pH10 there was added 10 parts of low molecular weight oxidised polyethylene in the form of a 20% w/w emulsion. 0.2 parts of hydroxyethyl cellulose was then added and the mixture agitated on a high energy mixer at 85° C. The high energy mixer was then removed and a paddle stirrer inserted. 20 parts of diethyl aniline was added and the mixture maintained for 30 minutes. The pH was then adjusted to pH1 by the addition of HCl over 2–3 minutes and the mixture stirred for a further 30 minutes. The resultant granules were sieved off on a 60 mesh (B.S.) sieve, washed with dilute acid and then water, and then dried at 60° C. to give 50 parts of a product which could be dispersed into polyethylene.

EXAMPLE 9

10 Parts of Staybelite resin (hydrogenated wood rosin) and 22.5 parts of 50% aqueous potassium hydroxide solution were high speed stirred using a cavitation mixer in 100 parts of water at 50° C. until a smooth dispersion had formed (approximately 20 minutes).

In a separate vessel, 15 parts of dicyclohexyl phthalate were dissolved in 30 parts of diethyl aniline with heating and 10 parts of the compound of average formula:

added with stirring to form a smooth paste at 50°–60° C. This paste was added to the dispersion of Staybelite resin with the aid of a further 10 parts of diethyl aniline, and the whole high speed stirred until a smooth blue emulsion had formed (approximately 15 minutes).

92 Parts of crude copper phthalocyanine and 8 parts of phthalimide were ground in a ball mill until 55% of the copper phthalocyanine was in the α-crystal form. 97.8 Parts of this mixture, corresponding to 90 parts of copper phthalocyanine, were stirred in 200 parts of water at 50° C. until thoroughly wetted out. With high speed stirring, the above blue dispersion was poured into the wetted pigment and stirring maintained for 30 minutes, using external cooling as required to maintain the temperature of the mixture between 50° and 55° C.

A paddle stirrer was substituted for the high speed stirrer. While stirring at approximately 150 r.p.m., a solution of 5 parts calcium and 71 parts concentrated hydrochloric acid in 500 parts of water was run in over 5 minutes. After a further 30 minutes stirring, the pigment composition thus formed was isolated by filtration, washed salt and acid free with warm water and dried at 50°–60° C.

There were obtained 120.8 parts of small, non-dusting granules having excellent rheology and colour strength in toluene based publication gravure inks.

EXAMPLE 10

20 Parts of a β-copper phthalocyanine pigment and 0.3 parts Synperonic NX (a nonyl phenol-ethylene oxide condensate) were stirred in 500 parts of water until the pigment had thoroughly wetted out. The pH was raised to 11 with dilute sodium hydroxide solution and 0.5 part hydroxyethyl cellulose added prior to raising the temperature to 50° C.

5 Parts of a coumarone-indene resin (Escores 11028) were dissolved in 10 parts of diethyl aniline with heating. This solution was added to the pigment slurry while stirring with a paddle stirrer at approximately 150 r.p.m. and the mixture stirred at 50° C. for 30 minutes. While maintaining stirring, the pH was reduced to 1 by the addition over 5 minutes of hydrochloric acid.

After stirring for a further 30 minutes, the pigment composition so formed was recovered by pouring the reaction mixture onto a 100 mesh sieve, washing salt and acid free with warm water, and drying at 50°–55° C.

There were obtained 22.3 parts of evenly sized spherical granules of approximately 1 mm. diameter, suitable for the preparation of lithographic inks.

EXAMPLE 11

48.9 Parts of the ground copper phthalocyanine mixture of Example 9, containing 45 parts of copper phthalocyanine, were stirred for 5 hours at reflux in 250 parts of isopropanol-water azeotrope. 250 Parts of water were added and the isopropanol-water azeotrope removed by distillation. A further 250 parts of water were added to reduce the temperature to 50° C. 12.5 Parts of a hydrocarbon resin (Hercules A80) were dissolved in 25 parts of diethylaniline with heating and added to the stirring pigment slurry. 15 minutes later, 5 parts of the copper phthalocyanine sulphonic acid-tallow amine compound of Example 6 were added and the mixture stirred a further 15 minutes. The reaction mixture was acidified by adding 30 ml. of concentrated hydrochloric acid in 30 ml. of water.

The pigment composition so formed was recovered on a 60 mesh sieve (B.S.), washed with hot water and dried at 50°–55° C.

There were obtained 58.2 parts of spherical granules 78% of which were in the range of 0.21–0.32 mm. diameter.

EXAMPLES 12-18

0.2 Parts of hydroxyethyl cellulose was added to 20 parts of C.I. Pigment Yellow 17 as present in an aqueous slurry from an azo coupling. The temperature was raised to 80° C. and the pH adjusted to 10. 10 Parts of the alkyl aniline and varied amounts of di-isooctyl phthalate (DiOP) as shown in the Table below, were then added. The mixture was stirred for 20 minutes at which time beads of 1–2 mm. diameter had formed, the pH was then adjusted to ~1 with hydrochloric acid and stirring continued for 5 minutes. The beads were then filtered off, washed and dried at 50° C. The resulting products were evenly sized granules which could be incorporated into plasticised PVC to give a clear yellow film.

| Example | Alkylaniline | Parts of DiOP |
|---------|--------------|---------------|
| 12 | N,N-Diethyl aniline | 2 |
| 13 | N,N-Diethyl aniline | 4 |
| 14 | N,N-Diethyl aniline | 6 |
| 15 | N-ethyl aniline | 2 |
| 16 | N-butyl aniline | 2 |
| 17 | N-cyclohexyl aniline | 2 |
| 18 | N-hydroxyethyl-N-cyclohexyl aniline | 2 |

EXAMPLES 19–23

0.2 Parts of hydroxyethyl cellulose (Natrosol 250 HR) was added to 20 parts C.I. Pigment Yellow 17 as present in an aqueous slurry from an azo coupling. The temperature was raised to 80° C. and pH adjusted to 10 by the addition of 2 N sodium hydroxide. 10 Parts of NN-Diethyl aniline and 2 parts of a carrier, as shown in the table below, were added. The mixture was stirred for 60 minutes at which time granules of 1–2 mm. had formed. The pH was then adjusted to 1 with hydrochloric acid and stirring continued for 5 minutes. The granules were then filtered off, washed free of salts and dried at 50° C. The resulting products were dispersed into lithographic ink media to give a printing ink concentrate.

| Example | Carrier |
|---------|---------|
| 19 | Hercures A80 (a hydrocarbon resin) |
| 20 | Cetyl palmitate |
| 21 | Crodamide O (oleamide) |
| 22 | Cellulose acetate proprionate |
| 23 | Kemamine 19701 (monomethyl di (hydrogenated)tallow amine) |

EXAMPLE 24

20 Parts of C.I. Pigment Yellow 17 as present in an aqueous slurry from an azo coupling and 0.2 parts hydroxyethyl cellulose (Natrosol 250 HR) were adjusted to pH10 by the addition of 2 N sodium hydroxide. 2 Parts of hydrogenated wood rosin (Staybelite resin) as an aqueous solution of its potassium salt were added to the pigment slurry. After stirring for 10 minutes 1 part of calcium chloride dihydrate in 10 parts of water was added and the temperature raised to 85° C. 10 Parts of NN-diethyl aniline were then added and stirring continued for 1 hour at 85° C. The pH was adjusted to 1 with hydrochloric acid and the granules removed by filtration. They were then washed and dried. The product was easily dispersed into lithographic varnish.

EXAMPLE 25

To the pigment slurry as used in Example 24 were added 0.2 parts hydroxyethyl cellulose (Natrosol 250 HR) 2 g. stearic acid and 0.6 parts calcium chloride dihydrate; the pH was adjusted to 10 by the addition of 2 N sodium hydroxide, the temperature raised to 85° C. and 10 parts NN-diethyl aniline added. After stirring for 1 hour the pH was adjusted to 1 by the addition of 5 N hydrochloric acid and the granules removed by filtration. They were then washed and dried. The product could be dispersed into polyvinyl chloride.

EXAMPLE 26

An aqueous slurry of 100 parts of C.I. Pigment Yellow 13 as formed in a conventional azo coupling and 2 parts of hydroxyethyl cellulose (Natrosol 250 HR) were stirred together for 20 minutes at 15° C. The slurry pH was adjusted to 10 by the addition of 2 N sodium hydroxide, and a mixture of 10 parts dioctyl phthalate and 100 parts diethyl aniline were added. Stirring was continued for 90 minutes at 15° C. until granule formation was complete. The pH was then adjusted to 1 by the addition of hydrochloric acid and the resultant granules, 100 parts, recovered by separation on a 60 mesh sieve, washing and drying at 50° C. The product could be dispersed into lithographic ink media.

EXAMPLE 27

16 Parts of C.I. Pigment Green 7 in the form of a 30% w/w presscake were dispersed into 300 parts water. To this dispersion were added 3 parts hydrogenated wood rosin (Staybelite resin) as an aqueous solution of its potassium salt. This mixture was stirred for 2 hours, then 0.2 parts hydroxyethyl cellulose (Natrosol 250 HR) and 3 parts sorbitan tristearate (Span 65) were added. This mixture now at pH 9 was heated to 85° C., the pH was adjusted to 6 with 5 N hydrochloric acid and 24 parts sodium acetate, 8 parts sodium chloride and 16 parts NN-diethyl aniline added. The mixture was stirred at 85° C. for 5 minutes, and the pH was then adjusted to just below 1 by the addition of 5 N-hydrochloric acid. The resulting granules were filtered on a 60 B.S. mesh sieve, washed free of inorganic salts and acids and dried at 55° C. The resulting product, 22 parts, could be dispersed into plasticised P.V.C.

EXAMPLE 28

100 Parts of an aqueous slurry of C.I. Pigment Yellow 13, prepared as for Example 9, was adjusted to pH 11 with 2 N sodium hydroxide and 1 part of hydroxyethyl cellulose (Natrosol 250 HR) and 30 parts hydrogenated wood rosin, as an aqueous solution of its potassium salt, were added. The mixture was raised to 85° C. and held at this temperature for 15 minutes. The pH was then adjusted to 6.2 and 50 parts of NN-diethyl aniline added. Stirring was continued for 15 minutes and the pH was then reduced to just below 1 by the addition of 5 N hydrochloric acid. The regular spherical granules were recovered by filtration, washing free of inorganic salts and acids and drying at 55° C. The resultant granules were dispersed into lithographic oil ink media to give excellent gloss as a print.

EXAMPLE 29

The procedure and quantities of Example 10 were repeated but the amount of hydrogenated wood rosin was reduced to 10 parts. A similar product with like properties was obtained.

EXAMPLE 30

20 Parts of a 5% w/w aqueous suspension of a C.I. Pigment Yellow 13 composition, formed by treatment with a sulphonic acid dyestuff and Rosin Amine D according to Example 109 of B.P. 1,356,253, was adjusted to pH 10 by the addition of 2 N potassium hydroxide; 0.2 parts hydroxyethyl cellulose (Natrosol 250 HR) and 2 parts hydrogenated wood rosin (Staybelite Resin), as an aqueous solution of its potassium salt, were added and the mixture heated to 85° C. 10 Parts of NN-diethyl aniline were then added and the mixture stirred for 1 hour at 85° C. before adjusting to just below pH 1 by the addition of 5 N hydrochloric acid. The resulting spherical granules were filtered, washed free of inorganic salts and dried at 50° C. This product could be dispersed into lithographic oil ink and showed greater transparency than the product of Example 11.

EXAMPLE 31

The procedure and quantities of Example 11 were repeated but the amount of wood rosin was increased to 6 parts. A product similar in appearance and performance to that of Example 12 was obtained.

EXAMPLE 32

20 Parts of a 5% w/w aqueous slurry of C.I. Pigment Yellow 13, prepared as for Example 9, and 0.2 part hydroxyethyl cellulose (Narosol 250 MR) was adjusted to pH 10 by the addition of 2 N sodium hydroxide. 20 Parts of NN-diethyl aniline and 2 parts dioctyl phthalate were added and the mixture stirred for 45 minutes at 20° C. The pH was then adjusted to just less than 1 by the addition of 5 N hydrochloric acid. The granule composition was isolated by filtration, washing free of inorganic salts and acid and dried at 55° C. The resulting granular product could be dispersed into lithographic ink.

EXAMPLE 33

20 Parts of C.I. Pigment Yellow 74 as a 5% w/w aqueous slurry, as prepared by conventional aqueous azo coupling, and 0.2 part hydroxyethyl cellulose (Natrosol 250 HR) were adjusted to pH 10 by the addition of 2 N sodium hydroxide. 2 Parts hydrogenated wood rosin (Staybelite Resin), as an aqueous solution of its potassium salt, was then added, the temperature raised to 85° C. and 10 parts NN-diethyl aniline added. Stirring was continued at 85° C. for 2 hours, the pH adjusted to just less than 1 by the addition of 5 N hydrochloric acid and the product isolated by filtration on a 60 B.S. mesh sieve, washed free of inorganic salts and acid and dried at 55° C. The resulting generally spherical granules could be dispersed into lithographic ink or decorative paint; in the latter application a very desirable opaque film could be achieved.

EXAMPLE 34

30 Parts of C.I. Pigment Yellow 83 as a 5% w/w aqueous slurry, as produced in a conventional aqueous azo coupling, was adjusted to pH 7 by the addition of 2 N potassium hydroxide, and 3 parts hydrogenated wood rosin (Staybelite Resin) were added as an aqueous solution of its potassium salt. 0.3 Parts hydroxyethyl cellulose (Natrosol 250 MR) was then added and the slurry now at pH 10 heated to 85° C. and held at 85° C. for 10 minutes before adjusting to pH 6 with 5 N hydrochloric acid. 30 parts of NN-diethyl aniline were then added and stirring continued at 85° C. for a further 10 minutes. The pH was then adjusted to less than 1 by the addition of 5 N hydrochloric acid and the granules isolated by filtration on a 60 B.S. mesh sieve, washed free of inorganic salts and acid and dried at 60° C. The resulting product could be dispersed into oil ink to give a strong transparent ink film. In a nitrocellulose binder—alcohol solvent liquid ink excellent rheology was obtained and the resultant film showed excellent gloss and brightness.

EXAMPLE 35

18 Parts of a β-copper phthalocyanine pigment and 2 parts bis-cetyloxysulphanilide of copper phthalocyanine in the form of a 10% w/w aqueous slurry were dispersed into 500 parts water in which there was dissolved 40 parts sodium chloride. To this dispersion was added 0.2 parts hydroxyethyl cellulose (Natrosol 250HR) and heating was commenced with stirring. At 70° C., 5 parts dicyclohexyl phthalate dissolved in 15 parts N,N-diethyl aniline were added and the temperature taken to 80° C. and the stirring continued for 2 hours. The pH was then reduced to just below 1.0 by the addition of 10 N hydrochloric acid. The resulting granules were separated by filtration and washed chloride free with water and dried at 40° C. in a drying cabinet with circulating air. The product could be dispersed into lithographic and publication gravure media.

EXAMPLE 36

200 Parts of the aqueous pigment slurry of Example 35 were added to 500 parts water in which there was dissolved 20 parts sodium chloride. To this dispersion was added 0.5 parts of a primary fatty (tallow) amine (Crodamine IT ex Croda) as the acetate in aqueous solution and 1.5 parts of an hydrogenated wood rosin (Staybelite Resin) as an aqueous solution of its potassium salt and 0.1 parts hydroxyethyl cellulose. Heating was commenced and, at 70° C., 15 parts N,N-diethyl aniline were added and the temperature taken to 80° C. and stirring continued for a further 80 minutes. The pH was then reduced as in Example 35 and the resulting product, which was composed of generally spherical granules, were separated on a B.S. 60 mesh sieve, washed free of chlorine ions and dried at 40° C. as in Example 35.

EXAMPLE 37

27 Parts of copper phthalocyanine (previously ground to an α/β ratio of 60:40) and 30 parts sodium chloride were dispersed into 700 parts water. 0.1 part hydroxyethyl cellulose was added and heating commenced. When a temperature of 70° C. was reached, 1.5 parts of a secondary fatty (coconut oil) amine (Armeen 2C ex Armour Hess) dissolved in 11.2 parts N,N-diethyl aniline were added. The temperature was raised to 80° C. and, 1 hour after the addition of the diethylaniline, 6 parts of a hydrogenated wood rosin (Stayoelite Resin) as an aqueous solution of its potassium salt was added. This was followed by 3 parts of the bis-cetyloxysulphanilide of copper phthalocyanine of Example 27. After stirring for a further 15 minutes, the pH was lowered to just below 1.0 by the addition of 10 N hydrochloric acid and the resulting generally spherical granules separated as in Example 27. The granules thus obtained could be readily dispersed in lithographic ink medium.

EXAMPLE 38

30 Parts of copper phthalocyanine (previously ground to an α/β ratio of 55:40) and 30 parts sodium chloride were dispersed into 700 parts water and 0.1 part hydroxyethyl cellulose added. Heating was commenced and 7.5 parts of an hydrogenated wood rosin (Staybelite Resin) as an aqueous solution of its potassium salt added. At a temperature of 75° C., 15 parts N,N-diethylaniline were added and the mixture stirred at 80° C. for a further 2 hours. The pH was lowered as in Example 35 and the resulting granules, after being separated and dried as in Example 36 could be readily dispersed in lithographic ink medium.

EXAMPLE 39

81.0 Parts of the pigment of Example 38, 90 parts sodium chloride and 9.0 parts of the bis cetyloxysulphanilide of copper phthalocyanine of Example 21 were dispersed in 1500 parts water. Heating was commenced and 2.25 parts of a primary fatty (tallow) amine (Crodamine 1T ex Croda) as the acetate in aqueous solution and 20.25 parts of an hydrogenated wood wosin (Staybelite Resin) as an aqueous solution of its potassium salt were added. Stirring was continued for 1 hour and 70 parts N,N-diethylaniline were added to the slurry at 80° C. After a further 15 minutes the pH was lowered as in Example 27 and the resulting granules, after being separated and dried as in Example 36, could be readily dispersed in lithographic and publication gravure ink media.

EXAMPLE 40-45

The procedure of Example 28 was repeated except that the N,N'-diethyl aniline was replaced by an equal amount of the amines listed below. Product appearance and performance was equivalent to that of Example 28.

| Example | Amine |
|---|---|
| 40 | N,N'-dimethyl-3-methylaniline |
| 41 | N,N'dipropyl-aniline |
| 42 | N-ethyl-2-methylaniline |
| 43 | N,N'-dibutylaniline |
| 44 | 2,5-dimethylaniline |
| 45 | methyl-anthranilate |

EXAMPLE 46

20 Parts of a pigment present in an aqueous slurry formed by conventional azo coupling techniques and 0.2 parts hydroxyethyl cellulose (Natrosol 250HR) were heated at pH 8 to 85° C. A solution of 5 parts of hardened castor oil in 15 parts of aniline was added and the mixture stirred for 1 hour at 85° C. The pH was then adjusted to ~1 and the granules recovered by filtration, washing and drying. The product can be easily dispersed into lithographic varnish.

EXAMPLE 47

10 parts of Solvent Yellow 48 was dispersed in 200 parts of water and 0.1 parts potassium resinate and 0.1 part hydroxyethyl cellulose (Nalrosol 250HR). The mixture was adjusted to pH 7 and 5 parts N,N'-diethylaniline added. The mixture was heated to 80° and held for 30 minutes, before adjusting to pH 1 with 10 N hydrochloric acid. The resulting granules were recovered by filtration washing and drying at 30° C.

EXAMPLE 48

An aqueous slurry of 20 parts of a CI Pigment Red 57: resin composition (16:4 part ratio by formation of the pigment metal salt in the presence of Staybelite resin, ex. Hercules Powder Co.) 0.5 parts hydroxyethyl cellulose (Natrosol 250HR) and 3.3 parts abietyl amine, added as its water soluble acetate salt, were heated to 95° C. at pH 10. 10 parts N,N'-diethylaniline were then added the pH adjusted to 7 and stirring continued for 2 hours at 95° C. The pH was then adjusted to 3.2 by the addition of glacial acetic acid.* The granules were isolated, washed and dried at 90°. The product could be dispersed into lithographic ink varnish.

*Adjustment to pH 1 with concentrated hydrochloric acid is to be avoided as it results in a product of poor performance, presumably due to breakdown of the metal salt at this pH.

EXAMPLE 49

100 parts of C.I. Pigment Green 7 as a 35% parts by weight presscake were dispersed in 2000 parts of water using a modified mixer/emulsifier head as described in the text. After 20 minutes mixing a solution of 30 parts of Staybelite resin as its ammonium salt was added and mixing continued for a further 60 minutes. 0.4 parts hydroxyethyl cellulose (Natrosol 250 HR) and 20 parts sorbitan tristearate were then added and the temperature raised to 85° C. With continued mixing 30 parts of N,N'-diethylaniline, dispersed in 100 parts of water and 0.5 parts of dissolved potassium resinate, was added. The modified mixer/emulsifier stirring was continued for 1 minute, the pH adjusted to 6 and stirring continued for a further 5 minutes before adjusting to pH 1 by the addition of 5 N hydrochloric acid. The granules were removed by filtration on a 200 mesh BS sieve, washed free of acid and salts and dried at 45° C. The resultant granules, all of <0.5 mm diameter could be readily dispersed into a plasticised P.V.C. compound.

The addition of 1% by weight of Aerosil R 972 (ex. Degussa) to the above granules gave a product of improved free flowing properties especially after storage.

EXAMPLE 50

The procedure of Example 49 was repeated except that the solution of Staybelite resin was replaced by a solution 30 parts of Ennesin A 100 (ex Leon Frankel) as its potassium salt. A product of similar properties was produced.

What is claimed is:

1. A process for producing a pigment of dyestuff composition in the form of dustless readily-dispersible granules which comprises contacting, with agitation, (1) an aqueous dispersion of a pigment, (2) an aniline which is liquid at temperatures below 100° C., insoluble in water at pH values above 7, and soluble in water at pH values below 7, and (3) an organic carrier, which has a melting point above 40° C. and is soluble in, or at least softened by, the aniline and is insoluble or can be rendered insoluble in water throughout the pH range used in the process, the pH value being first above 7, maintaining the temperature above the melting point of the aniline and stirring at least until the pigment has migrated from the aqueous phase to the organic phase, consisting of the organic carrier and the aniline, and then reducing the pH to below 7 to render the aniline soluble in water, and recovering the resulting granules in a solvent free condition.

2. A process as claimed in claim 1, in which the aniline is a mono- or di-alkyl aniline in which each alkyl group has 1 to 8 carbon atoms.

3. A process as claimed in claim 1, in which the amount of the aniline is from 0.1 to 2 parts by weight per part of pigment.

4. A process as claimed in claim 1, in which the amount of the aniline is from 0.3 to 0.6 parts by weight per part of pigment.

5. A process as claimed in claim 1, in which the carrier is a carboxylic acid ester, a carboxylic acid amide, a phosphate ester, a resin, a vinyl polymer, a styrene polymer, a polyolefine, a fatty alcohol, a fatty amine which does not give water soluble salts, a fatty oxazoline, a water insoluble carboxylic acid or a rosin derivative.

6. A process as claimed in claim 1, in which the amount of carrier is from 0.05 to 2 parts by weight per part of pigment.

7. A process as claimed in claim 6, in which the amount of carrier is from 0.1 to 0.7 part by weight per part of pigment.

8. A process as claimed in claim 1, which is carried out in the presence of a protective colloid.

9. A process as claimed in claim 8, in which the protective colloid is mixed with an aqueous pigment slurry or an aqueous dispersion of the amine before the pigment or dyestuff and amine are brought together.

10. A process as claimed in claim 8, in which the protective colloid is a cellulose derivative.

11. A process as claimed in claim 10, in which the amount of protective colloid is up to 15% by weight of the pigment or dyestuff.

12. A process as claimed in claim 11, in which the amount of protective colloid is less than 5% by weight of the pigment.

13. A process as claimed in claim 5 which is carried out at a temperature at which the carrier is dissolved in the aniline.

14. A process as claimed in claim 1, in which the stirring is such as will produce granules of a size from 0.1 to 5 mm. in diameter.

15. A process as claimed in claim 1, in which the stirring is such as will produce granules of a size from 0.5 to 2 mm. in diameter.

* * * * *